(12) United States Patent
Saito et al.

(10) Patent No.: US 9,135,232 B2
(45) Date of Patent: Sep. 15, 2015

(54) INPUTTING INFORMATION INTO AN ELECTRONIC FORM

(75) Inventors: Akira Saito, Kanagawa (JP); Takeyuki Shimura, Kanagawa (JP)

(73) Assignee: International Business Machines Corporation, Armonk, NY (US)

( * ) Notice: Subject to any disclaimer, the term of this patent is extended or adjusted under 35 U.S.C. 154(b) by 933 days.

(21) Appl. No.: 13/293,598

(22) Filed: Nov. 10, 2011

(65) Prior Publication Data

US 2012/0137206 A1    May 31, 2012

(30) Foreign Application Priority Data

Nov. 30, 2010  (JP) ................................. 2010-266052

(51) Int. Cl.
*G06F 17/00* (2006.01)
*G06F 17/24* (2006.01)

(52) U.S. Cl.
CPC .................................. *G06F 17/243* (2013.01)

(58) Field of Classification Search
CPC .................................................. G06F 17/243
USPC ......... 715/200, 221, 222, 223, 224, 226, 230, 715/231, 255, 272, 271
See application file for complete search history.

(56) References Cited

U.S. PATENT DOCUMENTS

| | | | | |
|---|---|---|---|---|
| 5,563,999 | A * | 10/1996 | Yaksich et al. | 715/209 |
| 8,448,061 | B1 * | 5/2013 | Linburn | 715/224 |
| 2002/0184396 | A1 * | 12/2002 | Fujikura | 709/310 |
| 2004/0250132 | A1 * | 12/2004 | Sugimoto et al. | 713/201 |
| 2005/0086643 | A1 * | 4/2005 | Shane | 717/124 |
| 2008/0235334 | A1 * | 9/2008 | Gupta et al. | 709/206 |
| 2008/0285071 | A1 * | 11/2008 | Mori et al. | 358/1.15 |
| 2010/0162094 | A1 * | 6/2010 | Bolon | 715/222 |
| 2011/0179126 | A1 * | 7/2011 | Wetherell et al. | 709/206 |
| 2011/0271173 | A1 * | 11/2011 | Ait-Mokhtar et al. | 715/226 |

(Continued)

FOREIGN PATENT DOCUMENTS

| | | |
|---|---|---|
| JP | H10124461 A | 5/1998 |
| JP | 1999328172 A | 11/1999 |
| JP | 2001142848 A | 5/2001 |

(Continued)

OTHER PUBLICATIONS

Non-Final Office Action in related U.S. Appl. No. 13/486,423, mailed on Jun. 18, 2015; 7 pages.

*Primary Examiner* — Stephen Hong
*Assistant Examiner* — Gregory J Vaughn
(74) *Attorney, Agent, or Firm* — Schmeiser, Olsen & Watts LLP (57) ABSTRACT

Described is a method to communicate to a third party information for part of an electronic form that cannot be competed and then to incorporate returned information into the electronic form. In various embodiments, while filling in an electronic form, a requestor requests assistance in the form of information from a third party such as a supervisor. The requestor specifies a range of the part requiring assistance, and copies the partial form into a field of a message. An agent acquires information concerning the partial form based on the copy operation. The message including the information on the partial form is sent to the third party. The third party inputs information into an input field concerning the input request and returns the partial form in a message. The agent incorporates the information included in the returned message into the original electronic form.

9 Claims, 7 Drawing Sheets

(56) References Cited

U.S. PATENT DOCUMENTS

| | | | |
|---|---|---|---|
| 2013/0124961 A1* | 5/2013 | Linburn | 715/224 |
| 2013/0174020 A1* | 7/2013 | Martin et al. | 715/234 |

FOREIGN PATENT DOCUMENTS

| | | |
|---|---|---|
| JP | 2001222574 A | 8/2001 |
| JP | 2003108369 A | 4/2003 |
| JP | 2004178268 A | 6/2004 |
| JP | 2004265402 A | 9/2004 |
| JP | 2005031979 A | 2/2005 |
| JP | 2007272620 A | 10/2007 |
| JP | 2008123395 A | 5/2008 |
| JP | 2009070350 A | 4/2009 |
| JP | 2008186217 A | 8/2009 |
| JP | 2010128916 A | 6/2010 |
| JP | 2010519611 A | 6/2010 |
| JP | 2010170165 A | 8/2010 |

* cited by examiner

| ID OF PARTIAL FORM | ID OF ORIGINAL FORM | ID OF INCLUDED INPUT FIELD |
|---|---|---|
| Shinseisyo1-1 | Shinseisyo1 | 2, 3, 5 |
| Shinseisyo1-2 | Shinseisyo1 | 8, 9, 10 |
| Shinseisyo2-1 | Shinseisyo2 | 2, 3, 5 |
| Shinseisyo3-1 | Shinseisyo3 | 4, 5, 8 |
| ... | ... | |

FIG. 5A

| ID OF ORIGINAL FORM | INFORMATION SPECIFYING FORM (EXAMPLE: URL) |
|---|---|
| Shinseisyo1 | http://www.xyz.../.../form |
| Shinseisyo2 | http://www.xyz.../.../form |
| Shinseisyo3 | http://www.abc.../.../form |
| ... | ... |

FIG. 5B

| ID OF INPUT FIELD | INPUT INFORMATION |
|---|---|
| 1 | TOKKYO TARO |
| 2 | ttokkyo |
| 4 | PRODUCT DEVELOPMENT |

INPUTTING INFORMATION INTO AN ELECTRONIC FORM

RELATED APPLICATION

This application is a utility application claiming priority to co-pending Japanese Patent Application No. 2010-266052 filed Nov. 30, 2010, the entirety of which is incorporated by reference herein.

FIELD OF THE INVENTION

The present invention relates to a method of inquiring about part of form input, a computer program used for the method, and a processor loaded with the program. The present invention particularly relates to a method of inquiring about part of form input, a computer program used for the method, and a processor loaded with the program that can, in the case where it is necessary to inquire of a third party about part of data input while filling in an electronic form, incorporate data returned from the third party into the form in a simple and versatile manner.

BACKGROUND

In recent years, it has become fairly common to make some kind of public or private application not by submitting a paper medium but by means of an electronic application, that is, filling in an electronic application form on an electronic terminal and sending the electronic application form to its destination via a network. In such an electronic application the application form has a plurality of data input fields and an applicant inputs various information necessary for examining the application in the plurality of data input fields before pressing a send button to complete the application.

In the above-described electronic application and also in an application by paper medium, the applicant often encounters a difficulty in writing or inputting in the form. For example, in the case where the applicant is requested to write or input a code or a class (e.g. "department code" or "charge code") set regardless of his/her intension while filling in the form, if the applicant does not know the code or the like, the applicant needs to temporarily suspend the fill-in process and refer to a guide and the like or inquire of a third party such as his/her superior. This process requires time and effort. Particularly in the electronic application, a complex process of sending mail or the like to inquire of the third party and inputting information included in a reply into an input field is needed.

BRIEF SUMMARY

In one aspect, a computer-implemented method is provided for inputting information into an electronic form. The method includes specifying by an operator a range of a part of an electronic form having an input field for which third party information is to be obtained by a third party. A partial form is automatically generated in a message field of an electronic message and has the input field for the third party information. The electronic message is sent to the third party. After the third party receives the electronic message, the third party information is input into an input field of a return electronic message and the return electronic message is sent to the operator. The third party information in the input field of the return message is automatically input into the input field of the part of the electronic form.

In another aspect, a computer program product is provided for inputting information into an electronic form. The computer program product includes a computer readable storage medium having computer readable program code embodied therewith. The computer readable program code comprises computer readable program code configured to generate a partial form in a message field of an electronic message in response to a specification by an operator of a range of a part of an electronic form having an input field for which third party information is to be obtained from a third party. The computer readable program code also includes computer readable program code configured to send the electronic message to the third party and computer readable program code configured to receive a return electronic message having an input field that includes the third party information. The computer readable program code further includes computer readable program code configured to input the third party information in the input field of the return electronic message into the input field of the part of the electronic form.

In yet another aspect, the invention features a system for inputting information into an electronic form. The system includes a display, a user input device, a message module and a processor. The display is configured to present an electronic form to an operator. The user input device is configured to enable the operator to specify a range of a part of an electronic form having an input field for which third party information is to be obtained from a third party. The message module is configured to send a message to the third party and to receive a message from the third party. The processor communicates with the display, the user input device and the message module. The processor is configured to generate a partial form in a message field of an electronic message. The partial form has an input field for the third party information. The processor is configured to input the third party information included in an input field of a return electronic message received by the message module into the input field of the part of the electronic form.

BRIEF DESCRIPTION OF THE SEVERAL VIEWS OF THE DRAWINGS

The above and further advantages of this invention may be better understood by referring to the following description in conjunction with the accompanying drawings, in which like numerals indicate like structural elements and features in various figures. The drawings are not necessarily to scale, emphasis instead being placed upon illustrating the principles of the invention.

DETAILED DESCRIPTION

In the following description, specific details are set forth although it should be appreciated by one of ordinary skill that the systems and methods can be practiced without at least some of the details. In some instances, known features or processes are not described in detail so as not to obscure the present invention.

Public and private applications are often submitted by means of an electronic application, that is, filling in an electronic application form on an electronic terminal and sending the electronic application form to a destination via a network. Typically, the application form for the electronic application has a plurality of data input fields and an applicant inputs various information necessary for examining the application into the plurality of data input fields before pressing a send button to complete the application. The applicant often encounters difficulty in writing or inputting in the form. In one example, an applicant is requested to write or input a code or a class set regardless of his/her intension while filling in the form. If the applicant does not know the code or the like, the applicant needs to temporarily suspend the fill-in process and refer to a guide and the like. Alternatively, the applicant can inquire of a third party such as his/her superior. In the electronic application, a complex process of sending mail or the like to inquire of the third party and inputting information included in a reply into an input field is often needed.

Various embodiments of the present invention include a method of inquiring about part of form input, a computer program used for the method, and a processor loaded with the program that can, in the case where it is necessary to inquire of a third party about part of data input while filling in an electronic form, incorporate data returned from the third party into the form in a simple and versatile manner.

Figure 2:
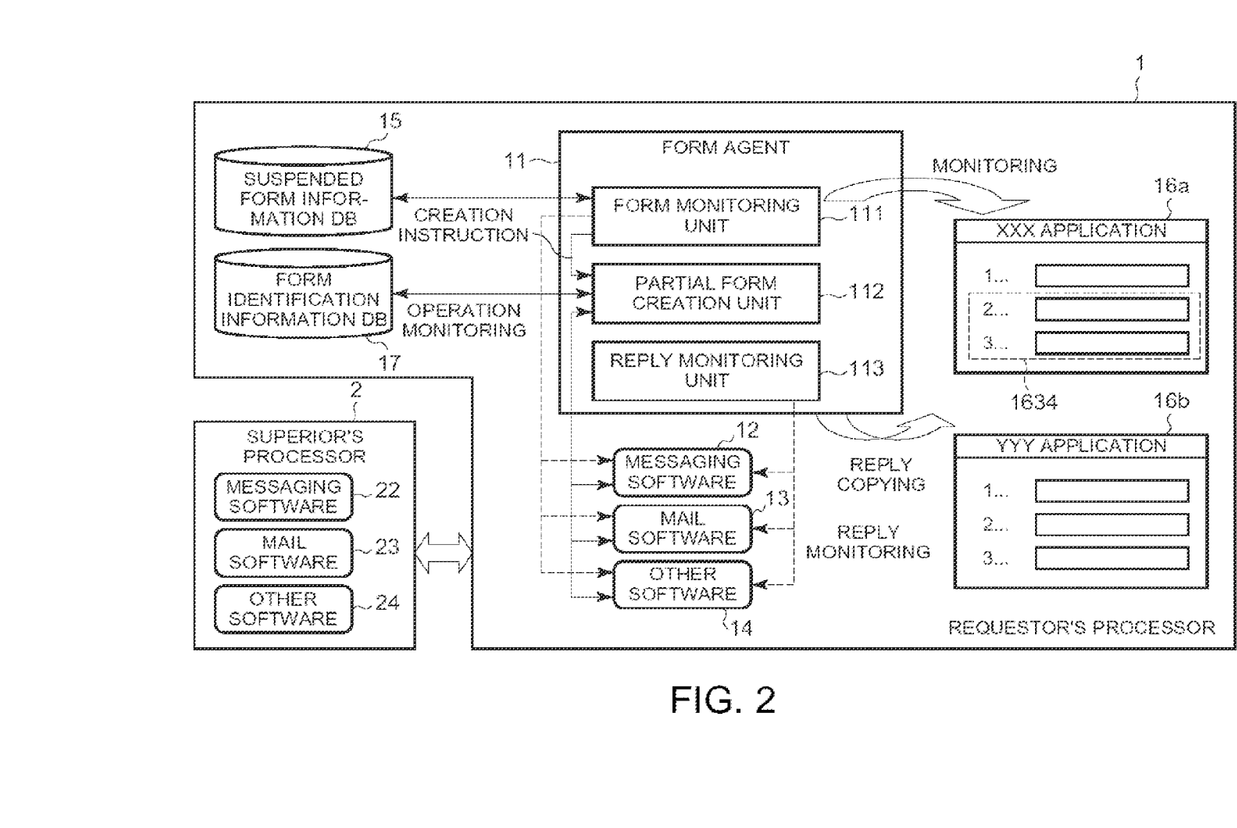
FIG. 2 is a block diagram showing a functional structure of each device for realizing the embodiment of the method of inquiring about part of form input according to the present invention.

FIG. 2 is a block diagram showing a functional structure of a device system for realizing an embodiment of a method of inquiring about part of form input according to the present invention. The device system is composed of a requestor's processor 1 operated by a requestor (application creator) named "Tokkyo Taro" as an example, and a superior's processor 2 operated by his/her superior as an example. The requestor's processor 1 and the superior's processor 2 are connected to each other via a network such as a company LAN. The block diagram relates merely to one example; the operators are not limited to company workers and the devices may be connected to each other via the Internet.

The requestor's processor 1 is loaded with software such as form agent software (hereafter simply referred to as "form agent") 11, messaging software 12 (e.g. Sametime® by IBM), mail software 13 (e.g. Notes® by IBM), and other software 14. Here, there is no need to provide both the messaging software 12 and the mail software 13, so long as at least one of the messaging software 12 and the mail software 13 is provided. In terms of immediacy, the messaging software 12 is more preferable.

The form agent 11 includes at least a form monitoring unit 111, a partial form creation unit 112, and a reply monitoring unit 113.

Though not shown, the requestor's processor 1 is also loaded with a Web browser (e.g. Internet Explorer® by Microsoft Corporation or Mozilla Firefox® by Mozilla Foundation) for filling in an electronic form. Application form editing screen examples (an XXX application 16*a*, a YYY application 16*b*) by the Web browser are shown in FIG. 2.

Moreover, the requestor's processor 1 includes a suspended form information database (DB) 15 in which, for example when the person filling in the electronic form (application creator) (requestor) suspends the form fill-in process in order to make a partial request according to the present invention, data that has been input up to the suspension is stored. The requestor's processor 1 further includes a form identification information database (DB) 17 in which information about a created partial form, an original form, and an input field is stored.

The suspended form information DB 15 and the form identification information DB 17 need not be formed in dedicated hardware. Typically, the suspended form information DB 15 and the form identification information DB 17 are formed in a general-purpose storage device (in particular, a hard disk). The suspended form information DB 15 and the form identification information DB 17 need not necessarily be located in the requestor's processor 1, and may be formed in an external storage device (apparatus).

Though described in more detail later, the form monitoring unit 111 in the form agent 11 monitors a clipboard in the device, and issues a partial form creation instruction to the partial form creation unit 112 upon recognizing that the application creator (requestor) creates a partial form in an application form (a partial form 1634 in the XXX application 16*a* in FIG. 2) and copies and pastes the partial form to the messaging software 12, the mail software 13, or the like. Moreover, in the case where the application creator (requestor) suspends the form fill-in process with the creation of the partial form, the form monitoring unit 111 stores data that has been input up to the suspension (FIG. 5C described below), in the suspended form information DB 15.

Though described in more detail below, the partial form creation unit 112 acquires the information copied and pasted to a send field 122 of the messaging software 12 as the partial form. For the created partial form, the partial form creation unit 112 stores a table associating information for specifying the original form with information of an input field included in the partial form, a table associating the original form and information for specifying the original form, and a table associating the input field and information input in the input field, in the form identification information DB 17.

The reply monitoring unit 113 determines whether or not an ID assigned to the partial form returned from the superior as the requestee is stored in the form identification information DB 17. In the case where the ID is stored in the form identification information DB 17, the reply monitoring unit 113 displays a "copy to form" button 4 on the partial form 1634 displayed in a receive field 121 of the messaging software 12 of the requestor.

Moreover, when the requestor presses the displayed "copy to form" button 4, the reply monitoring unit 113 first restores the already input information stored in the suspended form information DB 15 and re-displays it by the browser in the case where the form being edited is closed. The reply monitoring unit 113 then copies the data of the returned partial form 1634 to the corresponding part of the original form, based on the correspondence relation between the partial form and the input field included in the partial form stored in the form identification information DB 17.

The superior's processor 2 is loaded with the same software as the requestor's processor 1, such as messaging software 22, mail software 23, and other software 24.

Though not shown, the requestor's processor 1 and the superior's processor 2 both include a display device such as a liquid crystal display and input or specifying means such as a keyboard and a mouse.

Though the term "superior's processor 2" is used here, in actuality the processor used by the superior typically has the same functional structure as the requestor's processor 1. This embodiment merely refers to the device operated by the superior as "superior's processor 2" as an example of requestee side, and shows a structure necessary for the requestee's device in FIG. 2.

The procedure of the embodiment of the method of inquiring about part of form input according to the present invention is described below, with reference to the drawings. In this embodiment, it is assumed that the application creator (requestor) and the superior (requestee) exchange messages respectively using the messaging software 12 and 22.

Figure 1:
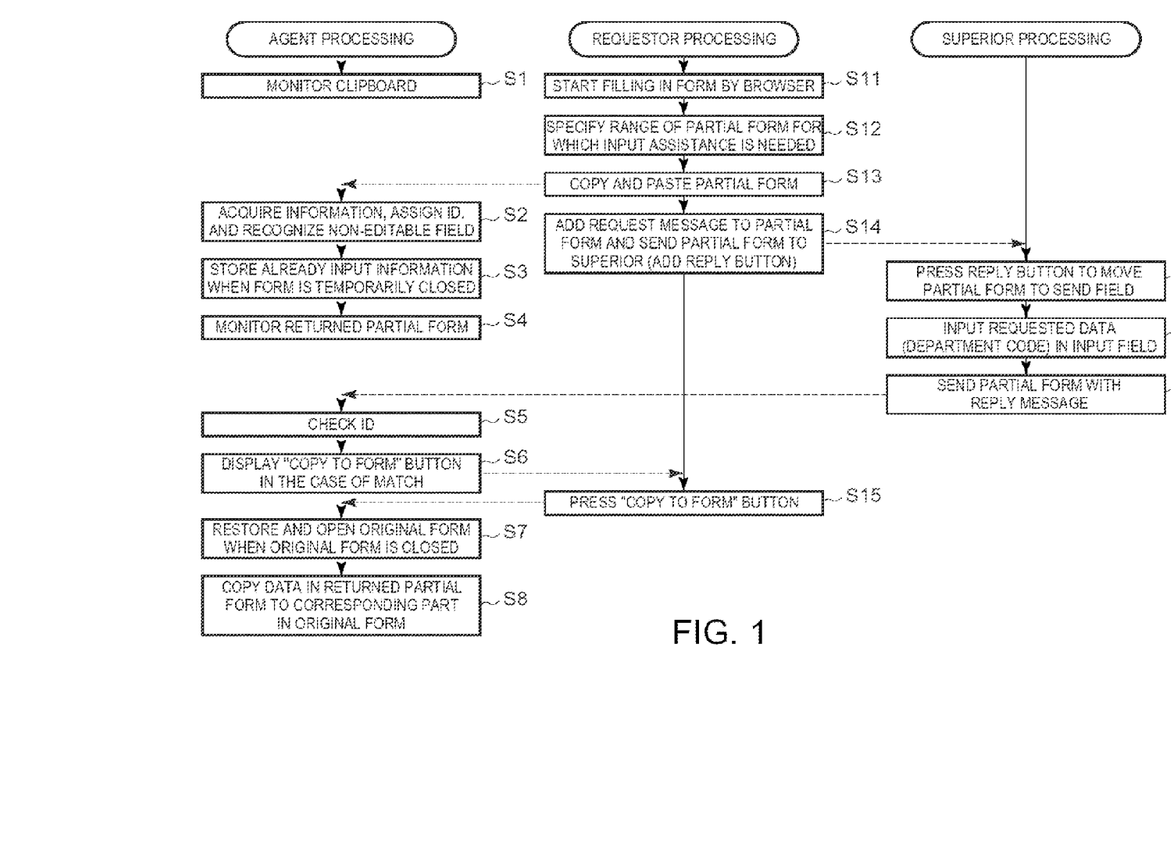
FIG. 1 is a flowchart showing a procedure of an embodiment of a method of inquiring about part of form input according to the present invention.

FIG. 1 is a flowchart showing a procedure of an embodiment of a method of inquiring about part of form input according to the present invention. First, the application creator (requestor) named "Tokkyo Taro" activates the Web browser to open a form input screen (e.g. the XXX application 16a in FIG. 3), and starts form input (step S11). Meanwhile, the form monitoring unit 111 in the form agent 11 monitors the clipboard (step S1).

Figure 3:
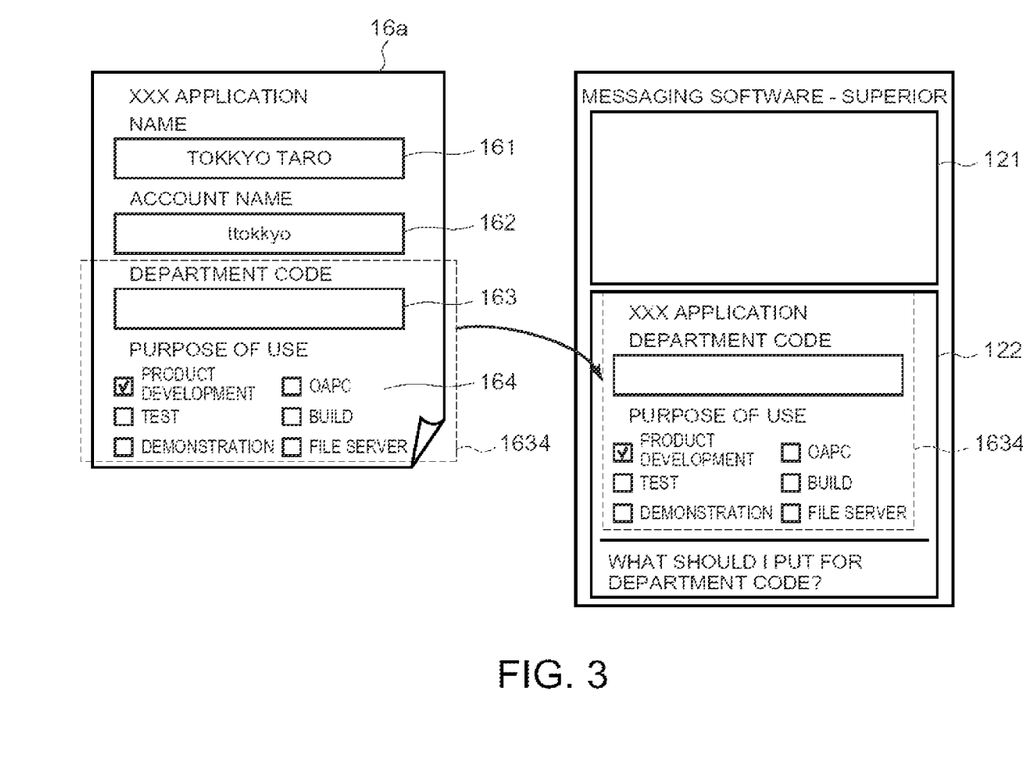
FIG. 3 is a diagram explaining a process of copying and pasting part of a form.

In the following, it is assumed that the application creator (requestor) is creating the XXX application 16a shown in FIG. 3. As shown in FIG. 3, the form of the XXX application 16a is made up of input fields 161, 162, 163, and 164 respectively for inputting a name, an account name, a department code, and a purpose of use.

The application creator (requestor) inputs data sequentially from the name field 161. In FIG. 3, "Tokkyo Taro" and "ttokkyo" are input respectively in the name field 161 and the account name field 162. Suppose here that the application creator (requestor) does not know the department code to be input in the department code field 163. On the other hand, the application creator (requestor) can input the following purpose of use, and so a checkmark is placed in a product development checkbox in FIG. 3.

The application creator (requestor) who does not know the department code to be input in the department code field 163 can ask for the superior's assistance (i.e. inquire of the superior) by presenting a corresponding partial form to the superior. It is assumed here that the department code is unable to be specified unless the purpose of use is known. Accordingly, the requestor specifies a range that includes both the department code field 163 and the purpose of use field 164, to create the partial form 1634, as shown in the left side of FIG. 3 (step S12). Though various range specification methods can be conceived by a person skilled in the art, the most typical method is dragging with a mouse not shown (i.e. range specifying means).

Note that it is necessary to enable the form agent 11 to recognize that the purpose of use item which has already been input does not need to be input or edited. For example, a specific operation (e.g. adding "(non-editable)") is applied to the input field.

Next, the requestor named "Tokkyo Taro" activates the messaging software 12. Here, the messaging software 12 may be activated before the above-mentioned range specification. A communication partner with which messages are to be exchanged is the superior whose assistance the requestor wants to ask for. A display screen of the messaging software 12 displayed on the requestor's processor 1 is shown on the right side of FIG. 3. An upper portion of the screen is the receive field 121 in which a message from the communication partner is output and displayed, whereas a lower portion of the screen is the send field 122 in which an input message to be sent to the communication partner is displayed.

The requestor copies and pastes the partial form 1634, specified in the form of the XXX application 16a, to the send field 122 of the messaging software 12 (step S13).

As mentioned earlier, the form monitoring unit 111 in the form agent 11 monitors an application form while monitoring the clipboard. Accordingly, when the requestor performs the copy and paste operation of the partial form 1634, the form monitoring unit 111 can recognize the copy and paste operation. Upon recognizing the copy and paste operation, the form monitoring unit 111 issues the partial form creation instruction to the partial form creation unit 112.

Having received the partial form creation instruction, the partial form creation unit 112 acquires the information copied and pasted to the send field 122 of the messaging software 12 as the partial form (step S2). For instance, in the case where the application form is edited by the browser as in this example, when the partial form 1634 is copied and pasted, not only text of a result of layout by the browser but also original HTML (HyperText Markup Language) document data is held on the clipboard.

As an alternative method, in a browser (e.g. Firefox) that supports DOM (Document Object Model) as an API (Application Programming Interface) for enabling an HTML document to be referred to and operated from an application program, information or components in the browser can be treated as DOM objects using JavaScript®. This means that the range of the partial form selected by the requestor can be accessed by the DOM API. In detail, the use of JavaScript enables acquisition of a DOM: window object corresponding to a page, and the use of a getSelection method of the window object enables acquisition of a DOM: selection object corresponding to a selection range list and acquisition of a DOM: range object corresponding to an individual selection range.

Therefore, by implementing part or all of the functions of the form agent 11 as an add-on of the browser, it is possible to acquire information about the range of the partial form selected by the requestor and information included in the range.

Figure 4:
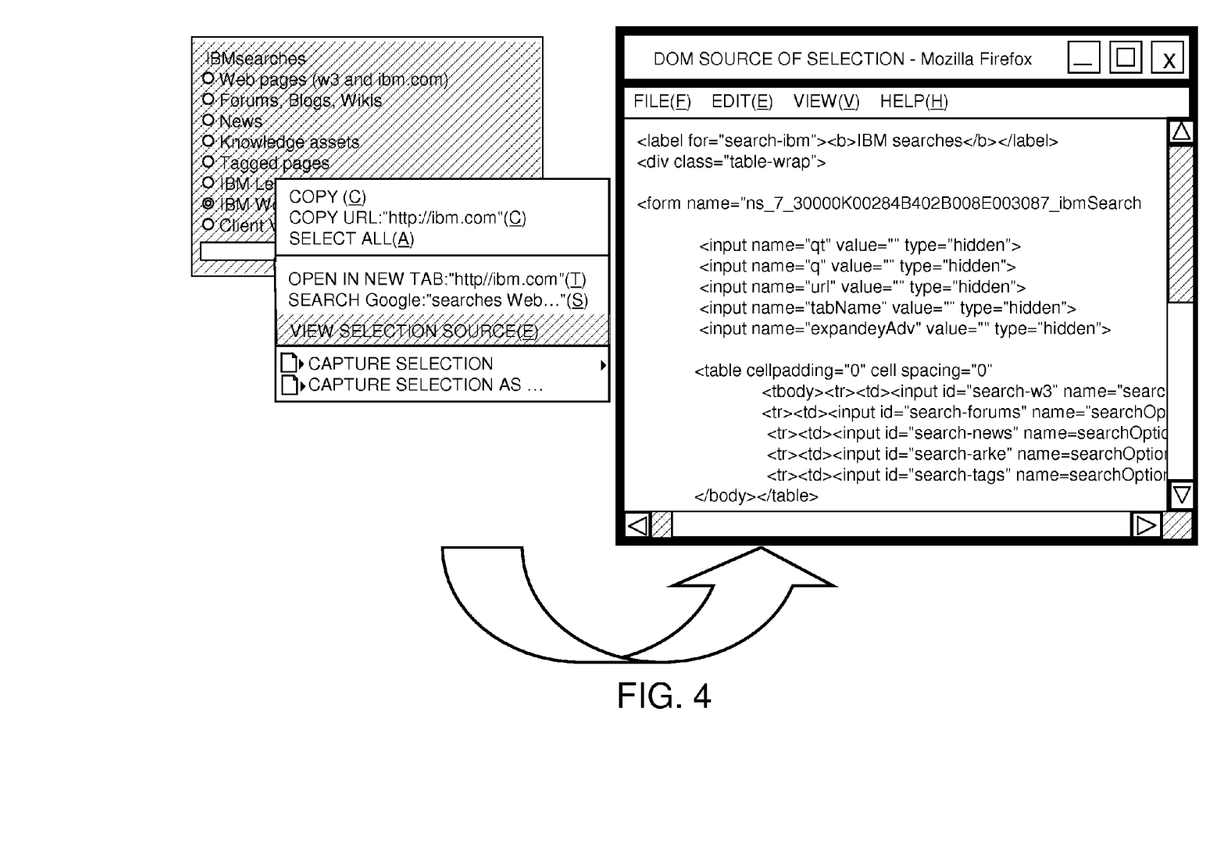
FIG. 4 is a diagram explaining that information concerning copying part of a form can be recognized by an agent according to the present invention.

FIG. 4 shows an example of incorporating a function capable of, in the case where a part is selected on the display screen of the browser, displaying a source of the selected part. In the same manner, the implemented add-on function adds a new menu (e.g. a context menu which is displayed by clicking the right mouse button and to which a command for acquiring information of the selected part is added) to the browser. When the requestor selects the added command in a state of selecting the partial form, the add-on function notifies the form agent 11 of the information about the selected partial form. The form agent 11 can acquire the information of the partial form in this way, too.

Having acquired the information about the partial form 1634 as described above, the partial form creation unit 112 first assigns an ID to the partial form 1634 itself so that the partial form returned from the requestee can be specified, and also stores information for specifying the original form corresponding to the partial form 1634 and information for specifying the input field included in the partial form 1634, in the form identification information DB 17 (step S2). Here, by further assigning an ID to the original form and retaining the ID and the information for specifying the form in a separate table so that the correspondence relation with the partial form is determined based on this ID, it is possible to easily deal with such a case as extracting different parts of the same form as partial forms and requesting different third parties to input these partial forms, or submitting applications of different purposes using the same form.

The information for specifying the input field included in the partial form is also used to prevent, even if a field irrelevant to the partial form is included in the reply to the input request, such a field from being copied to the original field, in particular to prevent a non-editable field from being copied to the original form. That is, in the case where a non-editable input field is included in the partial form by some kind of specification by the requestor as mentioned earlier, the partial form creation unit 112 does not include an ID of the input field in the table and only includes an ID of a remaining input field in the table.

Note that an ID assigned to each input field in the partial form may be an ID newly set in the partial form, or an ordinal position of appearance of the input field in the corresponding original form.

Figure 5A:
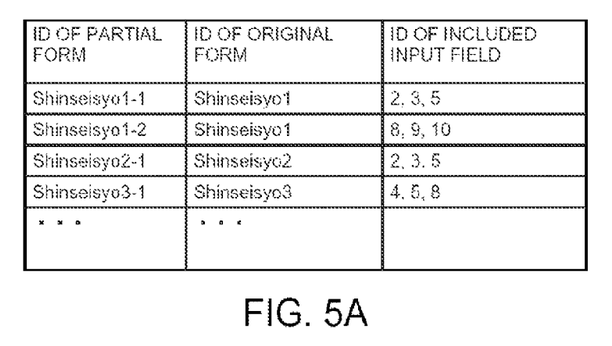
FIGS. 5A to 5C are diagrams showing tables stored in a form identification information database and a suspended form information database.
Figure 5B:
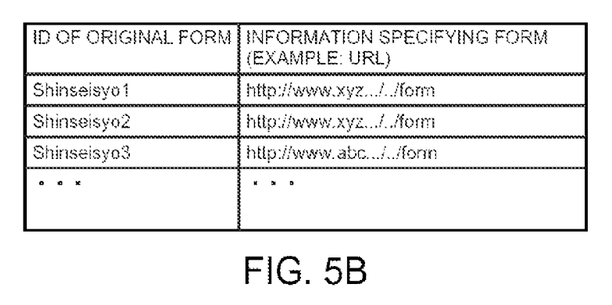

FIGS. 5A and 5B show examples of such information tables. FIG. 5A shows an example where the ordinal position of appearance in the corresponding original form is used as the ID of the input field. FIG. 5B shows an example where a URL is used as information for specifying the original form.

In FIG. 5A, the first row and the second row show an example of the case of extracting different parts of the same form as partial forms and requesting different third parties to input the partial forms. On the other hand, the first row and the third row show an example of the case of opening a form in the same URL for different applications, as can be understood with reference to FIG. 5B.

Referring back to the requestor processing in FIG. 1, after copying and pasting the partial form 1634 of the specified range to the messaging software 12, the requestor adds some kind of request message (e.g. "What should I put for department code?" as shown in FIG. 3) to the pasted partial form 1634 on an input field of the messaging software 12, and then sends the partial form 1634 to the requestee, i.e. the superior in this example (step S14). A below-described reply button can also be added for the requestee, in addition to the message. The button can be easily displayed by a scripting language program.

In the case where the form agent 11 acquires the information about the partial form not by the copy and paste operation but by the above-described alternative method, the form agent 11 needs to paste the partial form to the messaging software 12 (or the mail software 13 as described below). This function can be realized by using an API provided by the messaging software 12 (or the mail software 13), or by implementing a function capable of acquiring the information about the partial form as an add-on of the messaging software 12 (or the mail software 13) and notifying to the implemented add-on function by the form agent 11.

In the case where the form which is being filled in on the browser is temporarily closed after sending the partial form, the form monitoring unit 111 stores the information of the suspended form in the suspended form information database (DB) 15 (step S3).

Figure 5C:
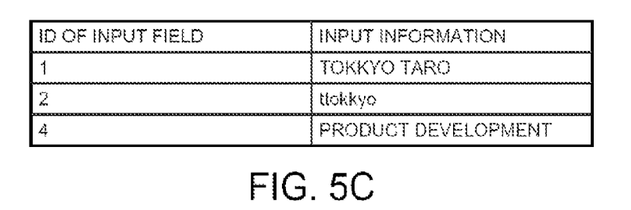

Here, it is sufficient to store a combination of an ID of each already input field and information input in the input field as shown in FIG. 5C (the example of FIG. 5C shows that "Tokkyo Taro" as the name (ID=1), "ttokkyo" as the account name (ID=2), and "product development" as the purpose of use (ID=4) have already been input), so long as the information can be obtained using the ID in the original form as a key. As a result, the restoration of the already input information (step S7 described below) in the restoration of the data in the suspended form can be achieved by the same process as copying the input information from the returned partial form to the original form (step S8 described below).

After the requestor sends the partial form 1634 to the superior by the messaging software 12, the form agent 11 enters a state of monitoring by the reply monitoring unit 113 (step S4).

Figure 6:
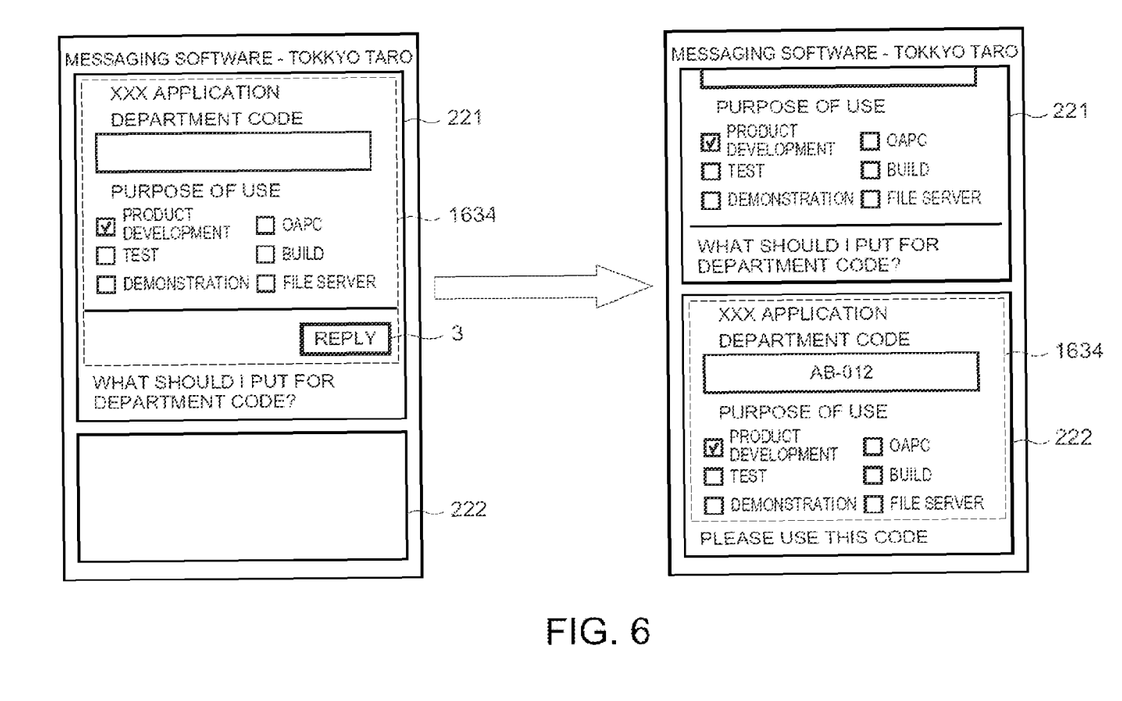
FIG. 6 is a diagram explaining a process when a superior requested to perform partial input inputs data and prepares to send the data.

Upon receiving the partial form 1634 from the requestor via the messaging software 22, the superior first presses the reply button 3 added to the partial form 1634 (step S21). FIG. 6 is a diagram showing a display screen of the messaging software 22 on the superior's processor 2, where a state of receiving the partial form 1634 from the requestor is shown on the left side. In detail, the partial form 1634 with the reply button 3 and the added message are displayed in a receive field 221.

When the superior presses the reply button 3, only the partial form 1634 in the information displayed in the receive field 221 is copied to a send field 222, as shown on the right side of FIG. 6.

The superior then inputs a specific code (e.g. "AB-012") in the department code input field in the partial form 1634 displayed in the send field 222, in order to notify the requestor of the requested department code (step S22). Meanwhile, the superior is not allowed to modify the purpose of use item, because the purpose of use item is set as non-editable by the form agent 11. Even if the superior can modify the purpose of use item, the modification is ignored by the form agent 11 as described above. Following this, the superior adds a reply message (e.g. "Please use this code" as shown in FIG. 7) to the partial form 1634 in the send field 222, and sends the partial form 1634 (step S23).

Note that the partial form sent/received by the messaging software 12 and 22 is accompanied by the ID assigned by the form agent 11, as described above.

When the partial form is returned from the superior as the requestee, the reply monitoring unit 113 in the form agent 11 checks whether or not the ID assigned to the returned partial form is stored in the form identification information DB 17 (step S5). In the case where the ID is not stored, the reply monitoring unit 113 abandons the returned partial form, without performing subsequent processing.

Figure 7:
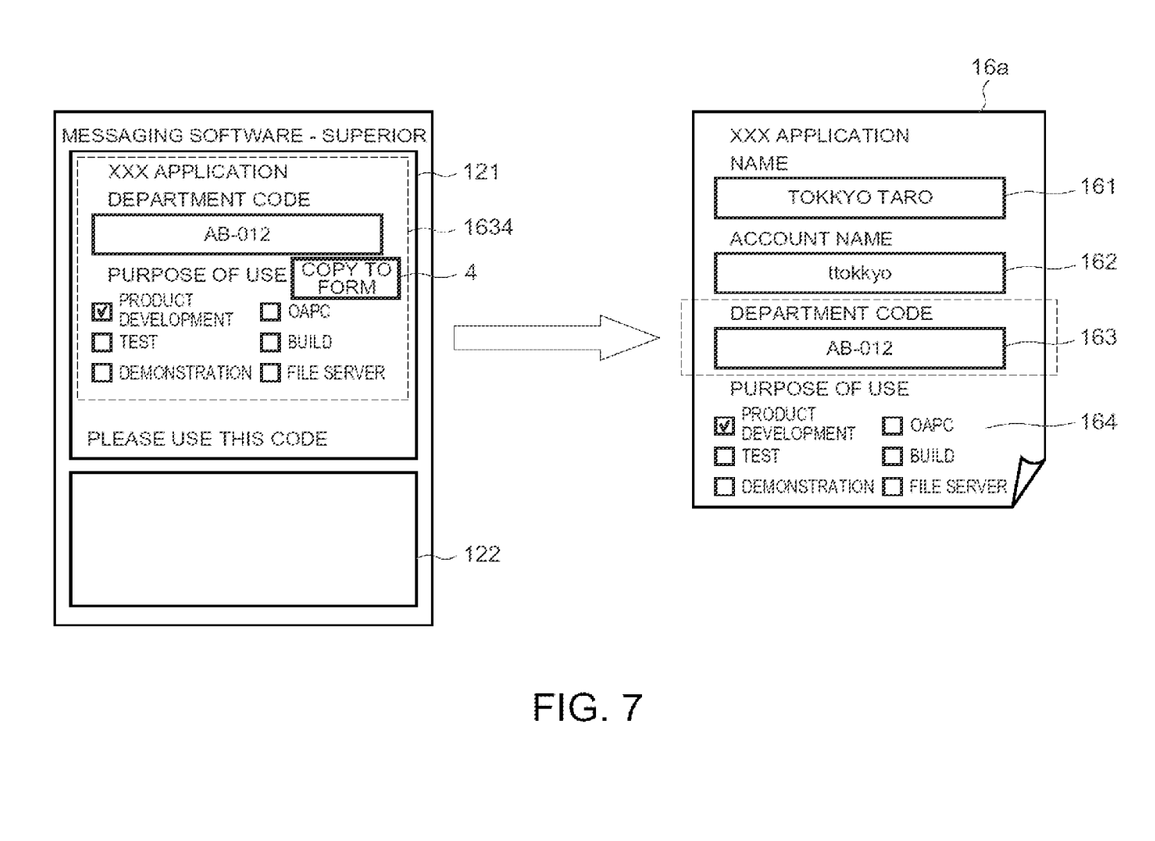
FIG. 7 is a diagram explaining a process from when a requestor named "Tokkyo Taro" receives data returned from the superior to when the requestor incorporates the returned data into the original form.

In the case where the ID is stored, on the other hand, the reply monitoring unit 113 displays the "copy to form" button 4 on the partial form 1634 displayed in the receive field 121 of the messaging software 12 of the requestor, as shown in FIG. 7 (step S6).

When the requestor (application creator) presses the displayed "copy to form" button 4 (step S15), the reply monitoring unit 113 first restores the form data stored in the suspended form information DB 15 and re-displays it by the browser in the case where the form being edited is closed (step S7). Next, based on the correspondence relation of each input field stored as described above, the reply monitoring unit 113 copies the data of the returned partial form 1634 to the corresponding part of the original form (the XXX application 16*a* in this example), i.e. the department code input field 163 in this example, as shown in FIG. 7 (step S8). This copy operation by the reply monitoring unit 113 can be realized, for example, as an add-on of the browser.

As described above, according to the embodiment of the present invention, in the case where the superior's assistance for part of data input becomes necessary while the employee is creating the application in the electronic form, the input field corresponding to the part is copied and pasted to the messaging software as the partial form and sent to the superior and, when the partial form including the data input by the superior is returned, the partial form is semi-automatically incorporated into the original electronic form. This facilitates electronic form creation.

Other Embodiments

Though the above embodiment describes the case where the messaging software 12 and 22 are used as the means for sending the partial form to the superior, the present invention is not limited to such. Software having a mail function (the mail software 13 and 23) may instead be used, though less favorable in terms of immediacy. In this case, the copy and paste operation of the partial form is performed in a message field of send mail. When the superior replies, a receive message is left in reply mail so that the superior can input data in the input field of the partial form in the receive message. This makes it unnecessary to provide the reply button 3 in the above embodiment. The other structure is the same as above. For example, when the ID of the partial form in the reply mail matches the ID stored in the form agent 11, the form agent 11 displays the "copy to form" button 4 in the reply mail.

Moreover, the means of sending the partial form to the superior is not limited to the messaging software 12 or the mail software 13, as any other software 14 capable of the copy and paste operation and the message exchange is also applicable.

Though the above embodiment describes the electronic form created by the browser as an example, the present invention is not limited to such, and the electronic form may be created by any software capable of specifying the range and extracting the information of the copy source.

What is claimed is:

1. A computer program product for inputting information into an electronic form, the computer program product comprising:
a non-transitory computer readable storage medium having computer readable program code embodied therewith, the computer readable program code comprising;
computer readable program code configured to generate a partial form in a message field of an electronic message in response to a specification by an operator of a range of a part of an electronic form having an input field for which third party information is to be obtained from a third party;
computer readable program code configured to send the electronic message to the third party;
computer readable program code configured to receive a return electronic message having an input field that includes the third party information; and
computer readable program code configured to input the third party information in the input field of the return electronic message into the input field of the part of the electronic form.

2. The computer program product of claim 1, wherein the computer readable program code configured to generate the partial form comprises:
computer readable program code configured to monitor a clipboard; and
computer readable program code configured to copy the partial form into the message field.

3. The computer program product of claim 1, wherein the computer readable program code configured to generate the partial form includes computer readable program code configured to acquire information corresponding to the partial form and to include the acquired information in the message field of the electronic message.

4. The computer program product of claim 1, further comprising computer readable program code configured to read an identification code assigned to the third party information in the input field of the return electronic message.

5. The computer program product of claim 1, further comprising computer readable program code configured to display to the operator a user input button that, upon selection, causes the third party information in the return electronic message to be automatically input in the input field of the part of the electronic form.

6. The computer program product of claim 1, further comprising:
computer readable program code configured to assign identification codes to a plurality of input fields in the partial form; and
computer readable program code configured to input information in each input file of a plurality of input fields in the returned electronic message into a respective input field in the electronic form.

7. The computer program product of claim 1, further comprising computer readable program code configured to close the electronic form after sending the electronic message to the third party until the return electronic message is received.

8. A system for inputting information into an electronic form, comprising:
a display configured to present an electronic form to an operator;
a user input device configured to enable the operator to specify a range of a part of an electronic form having an input field for which third party information is to be obtained from a third party;
a message module configured to send a message to the third party and to receive a message from the third party; and
a processor in communication with the display, the user input device and the message module, the processor configured to generate a partial form in a message field of an electronic message, the partial form having an input field for the third party information, the processor configured to input the third party information included in an input field of a return electronic message received by the message module into the input field of the part of the electronic form.

9. The system of claim 8 wherein the message module is at least one of a real-time messaging module and an electronic mail module.

* * * * *